(12) United States Patent
Ishiguro et al.

(10) Patent No.: US 8,730,494 B2
(45) Date of Patent: May 20, 2014

(54) IMAGE FORMING APPARATUS INCLUDING DISPLAY DEVICE

(75) Inventors: Yasuyuki Ishiguro, Osaka (JP); Hisashi Kunihiro, Osaka (JP); Hitoshi Nagahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 93 days.

(21) Appl. No.: 13/301,137

(22) Filed: Nov. 21, 2011

(65) Prior Publication Data

US 2012/0162703 A1 Jun. 28, 2012

(30) Foreign Application Priority Data

Dec. 27, 2010 (JP) ................................ 2010-290130

(51) Int. Cl.
*G06K 15/00* (2006.01)
(52) U.S. Cl.
USPC .......... 358/1.14; 358/1.15; 358/1.13; 399/24; 399/25; 399/26; 399/27
(58) Field of Classification Search
USPC ..................................................... 399/24–27
See application file for complete search history.

(56) References Cited

U.S. PATENT DOCUMENTS

| | | | | |
|---|---|---|---|---|
| 7,715,029 B2* | 5/2010 | Kayahara | ...................... | 358/1.13 |
| 7,856,202 B2* | 12/2010 | Mizobuchi et al. | ........... | 399/389 |
| 8,270,027 B2* | 9/2012 | Ban | ................................ | 358/1.9 |
| 8,400,661 B2* | 3/2013 | Grasso et al. | ................. | 358/1.15 |
| 2005/0231758 A1* | 10/2005 | Reynolds | ...................... | 358/1.15 |
| 2009/0314837 A1* | 12/2009 | Kataoka et al. | ............... | 235/385 |
| 2010/0161363 A1* | 6/2010 | Nakane et al. | ..................... | 705/7 |
| 2010/0188681 A1* | 7/2010 | Kawano | ........................ | 358/1.13 |
| 2011/0273739 A1* | 11/2011 | Grasso et al. | ................. | 358/1.15 |
| 2012/0182576 A1* | 7/2012 | Ishiguro et al. | .............. | 358/1.15 |

FOREIGN PATENT DOCUMENTS

| | | |
|---|---|---|
| JP | 2005-169897 A | 6/2005 |
| JP | 2005-169898 A | 6/2005 |
| JP | 2005-339045 A | 12/2005 |
| JP | 2007-183826 A | 7/2007 |
| JP | 2007-196485 A | 8/2007 |
| JP | 2009-024913 A | 2/2009 |
| JP | 2009-223394 A | 10/2009 |
| JP | 2010-201654 A | 9/2010 |

* cited by examiner

*Primary Examiner* — Dennis Dicker
(74) *Attorney, Agent, or Firm* — Edwards Wildman Palmer LLP; David G. Conlin; David A. Tucker (57) ABSTRACT

An image forming apparatus including an operation panel has, as a configuration of the operation panel, a display portion including a function to display environmental label information of the image forming apparatus. The environmental label information includes information on a type of greenhouse effect gases ($CO_2$) and a total emission amount of the greenhouse effect gases in a life cycle of the image forming apparatus. On the display portion, there is provided a selective display portion for displaying an environmental label as list display or thumbnail display, as well as selectively displaying detailed information of the environmental label according to the environmental label.

9 Claims, 9 Drawing Sheets

○ FOLLOWING ENVIRONMENTAL LABELS ARE ACQUIRED FOR THIS PRODUCT.
DETAILED INFORMATION OF ENVIRONMENTAL LABELS CAN BE VIEWED BY SELECTING
FOLLOWING ENVIRONMENTAL LABELS.

IMAGE FORMING APPARATUS INCLUDING DISPLAY DEVICE

This Nonprovisional application claims priority under 35 U.S.C. §119(a) on Patent Application No. 2010-290130 filed in Japan on 27 Dec. 2010, the entire contents of which are hereby incorporated by reference.

BACKGROUND OF THE INVENTION

1. Field of the Invention

The present invention relates to a display device and image forming apparatus using the same, and particularly to a display device for displaying environmental compliance acquisition information (environmental label) of an image forming apparatus and the image forming apparatus using the same.

2. Description of the Prior Art

Recently, among image forming apparatuses such as a copier, a facsimile, a printer or the like, one that enables selection of a model that is appropriate for a user by providing, at the time of selecting the model by the user, product information or the like based on a use environment of the user, has been known.

As a conventional art, one has been proposed in which, for example, based on a use history concerning image formation onto a sheet and product specifications data of an image forming apparatus currently being used, recommended specifications data serving as an index at the time of introducing a new model in place of the current apparatus are decided as a calculation result, and the decided recommended specifications data are output (Patent Literature 1: Japanese Patent Application Laid-open No. 2007-196485).

Thus, product specifications based on a user's use environment are provided for a time for renewal such as renewal of the image forming apparatus so that selection of a new model suitable for the user is able to be assisted.

However, by the above-described image forming apparatus, the presentation of the product specifications based on the user's use environment is useful renewal information for the user, while for a user with high environmental awareness wishing to contribute to prevention of global warming or the like out of considerations to recent global environment, information has not been enough.

SUMMARY OF THE INVENTION

The present invention has been devised in view of the above-described conventional problems, and aims to provide a display device capable of providing environmental information for a user and an image forming apparatus using the same.

The display device and the image forming apparatus using the same according to the present invention for solving the above-described problem are as follows.

A first aspect of the present invention is characterized by a display device comprising a display portion provided with a function to display environmental label information of an image forming apparatus, in which the environmental label information includes a type of greenhouse effect gases and a total emission amount of the greenhouse effect gases in a life cycle of the image forming apparatus, and the display portion includes a function to display an environmental label while displaying detailed information of the environmental labels.

Further, a second aspect of the present invention is characterized in that the environmental label is list-displayed or thumbnail-displayed.

Further, a third aspect of the present invention is characterized in that the display device includes a selective display portion for selectively displaying the detailed information according to the environmental label on the display portion.

Further, a fourth aspect of the present invention is characterized in that the detailed information includes at least the type of greenhouse effect gases and the emission amount of the greenhouse effect gases concerning use and/or maintenance in life cycle of the image forming apparatus.

Further, a fifth aspect of the present invention is characterized in that the display device includes a function to obtain the detailed information from a storage device of the image forming apparatus or a function to obtain the detailed information from a dealer or a leasing company via a network connected with the image forming apparatus.

Further, a sixth aspect of the present invention is characterized by an image forming apparatus comprising the display device according to any one of the aspects 1 to 5.

According to the first aspect of the present invention, environmental information concerning the image forming apparatus is able to be provided to a user. Moreover, for example, information on conserving a use frequency or on capability of reducing a maintenance cost and the like is able to be provided. Therefore, the information serves as an information source of selecting environment-friendly image forming apparatus at the time of renewal of the image forming apparatus by the user, thereby making it possible to meet the needs of a user, especially a user with high environmental awareness. This can eventually contribute to prevention of global warming.

In addition, for a dealer of image forming apparatuses (including a leasing company of image forming apparatuses and a manufacturer of image forming apparatuses), promotion of an image forming apparatus is brought in association with renewal thereof.

Further, according to the second aspect of the present invention, it is possible to improve the visibility of the detailed information for a user.

Further, according to the third aspect of the present invention, the detailed information desired by a user is able to be displayed readily, thus making it possible to attempt to improve convenience of operation.

Further, according to the fourth aspect of the present invention, environmental information concerning the image forming apparatus is able to be provided for a user.

Further, according to the fifth aspect of the present invention, in the case of obtaining the detailed information recorded in the storage device, a communication cost can be reduced, and on the other hand, in the case of obtaining the detailed information via the network, storage capacity of the storage device is able to be reduced so that an inexpensive storage device is able to be used.

Further, according to the sixth aspect of the present invention, environmental information concerning the image forming apparatus is able to be provided for a user, so that the information serves as an information source for selecting an environment-friendly image forming apparatus at the time of renewal of the image forming apparatus by the user, thus making it possible to meet the needs of a user, especially a user with high environmental awareness.

DESCRIPTION OF THE PREFERRED EMBODIMENTS

Description will be hereinafter given for embodiments of the present invention with reference to accompanying drawings.

Figure 1:
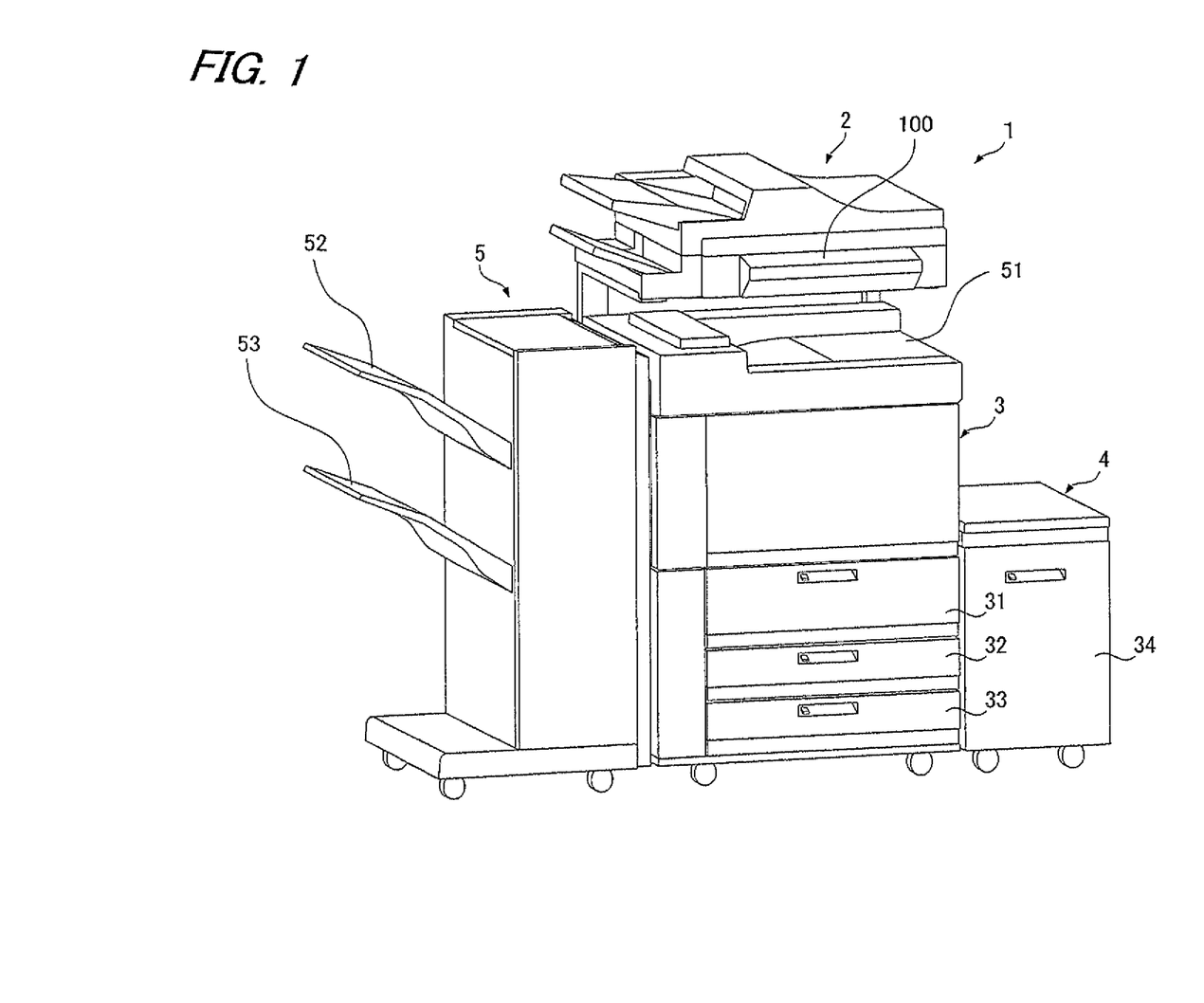
FIG. 1 is an explanatory view showing a whole configuration of an image forming apparatus according to an embodiment of the present invention.

FIG. 1 is an explanatory view showing a whole configuration of an image forming apparatus according to an embodiment of the present invention.

The present embodiment relates to an operation panel (display device) 100 that is used in an image forming apparatus 1 for forming an image by electrophotography with use of a toner shown in FIG. 1.

First, description will be given for a whole configuration of the image forming apparatus 1.

The image forming apparatus 1 forms an image on a predetermined sheet (recording sheet, recording medium) in accordance with image data transmitted from outside. As shown in FIG. 1, the image forming apparatus 1 is mainly comprised of an image forming portion 3 including an electrophotographic process portion (not shown) serving as a main device, and an image reading portion 2 including a scanner unit (not shown).

Image data that is obtained by reading a document image by the scanner unit is subjected to various processing and thereafter recorded in a memory once, and the image data is output to the image forming portion 3 from the memory in response to an output instruction so as to be reproduced on a photoreceptor drum (not shown) as a visible image with a toner, and subsequently the toner image is transferred onto a sheet.

A paper feed portion 4 for feeding sheets is configured next to the image forming portion 3.

The paper feed portion 4 has a first to third cassettes 31, 32 and 33 and also has a large capacity cassette 34 as an option. The large capacity cassette 34 is able to, for example, contain a large amount of A-4 size standard sheets which are most frequently used.

A paper discharge tray 51 is formed between the image reading portion 2 and the image forming portion 3.

A post-processing device 5 is provided next to the image forming portion 3.

To the post-processing device 5, a first paper discharge tray 52 and a second paper discharge tray 53 are provided.

The image forming apparatus 1 is then connected to a personal computer (PC) or a FAX via an unillustrated network line (LAN, telephone line, etc.).

Here, description will be given for a configuration of the image forming apparatus 1 with reference to a block diagram.

Figure 2:
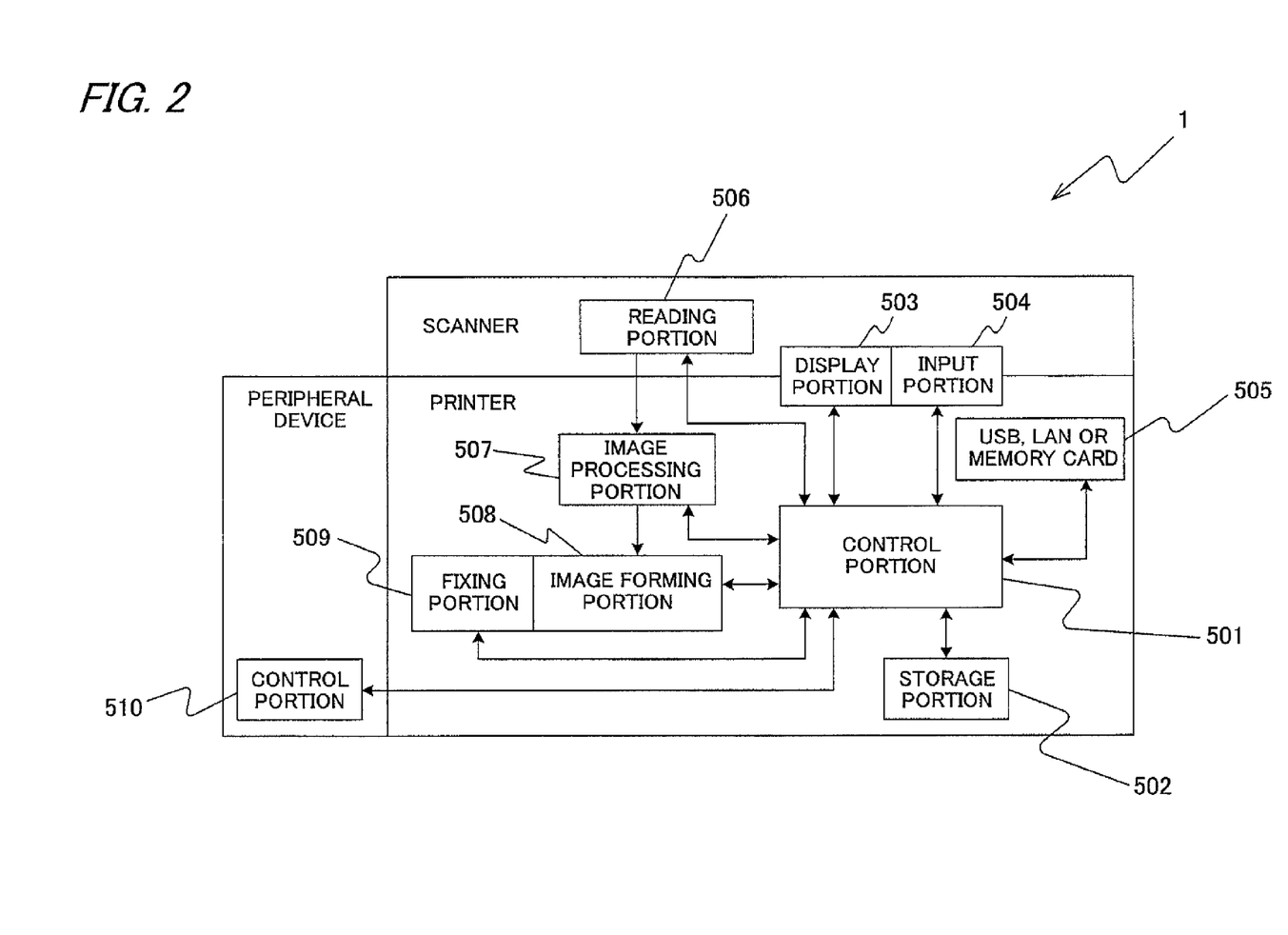
FIG. 2 is a block diagram showing a configuration of the image forming apparatus.

FIG. 2 is a block diagram showing a configuration of the image forming apparatus 1 of the present embodiment.

As shown in FIG. 2, as an electrical configuration, the image forming apparatus 1 is comprised of a control portion 501 for controlling an operation of the image forming apparatus 1, a storage portion 502, a display portion 503, an input portion 504, a communication portion 505 for performing a LAN connection or the like to a PC or the like via a network line, an image processing portion 507 for performing image processing, an image forming portion 508 for forming an image, a fixing portion 509 for performing fixing processing of a toner image, a reading portion 506 for reading an image on a scanner, and a control portion 510 for controlling an operation of the post-processing device 5 (indicating peripheral device in FIG. 2).

Next, description will be given for a configuration of the operation panel (display device) 100 (FIG. 1) in the image forming apparatus 1 of the present embodiment with reference to the drawings.

Figure 3:
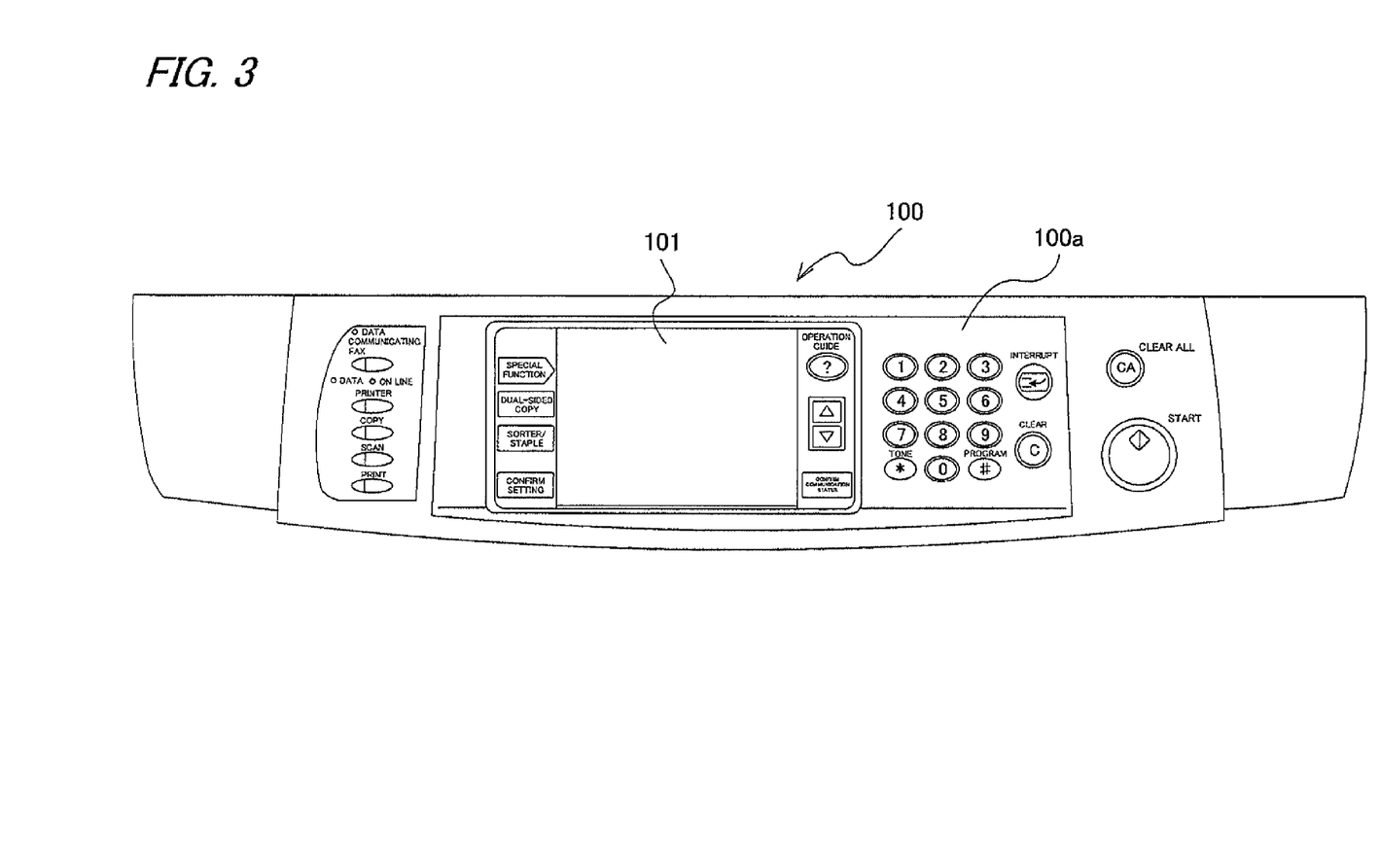
FIG. 3 is an explanatory view showing a configuration of an operation panel that constitutes the image forming apparatus.
Figure 4:
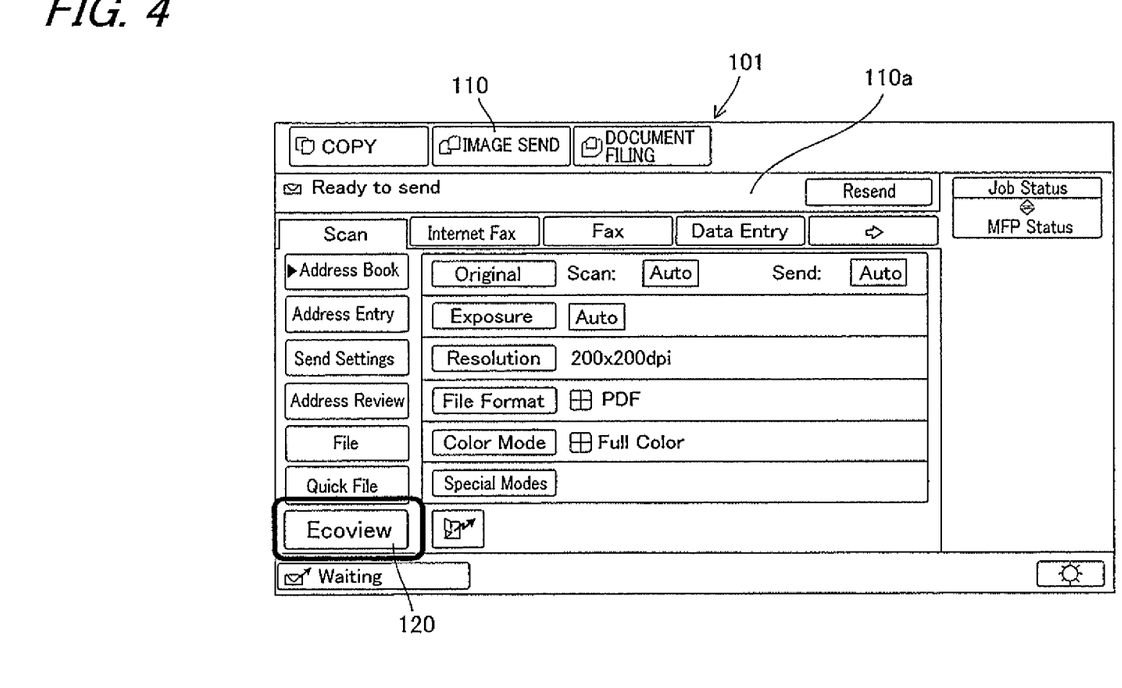
FIG. 4 is an explanatory view showing an initial screen of a display portion that constitutes the operation panel.

FIG. 3 is an explanatory view showing the configuration of the operation panel 100, and FIG. 4 is an explanatory view showing an initial screen of a display portion that constitutes the operation panel 100.

As shown in FIG. 3 and FIG. 4, on the operation panel 100, an operation surface (input portion) 100a is provided in an approximately flat state and a display portion 101 is provided in an approximately central portion thereof.

On the display portion 101, an operation key 110 for selecting processing mode of the image forming apparatus 1 (FIG. 4) is displayed.

The operation key 110 has a touch-panel display area showing COPY mode, IMAGE SEND mode and DOCUMENT FILING mode.

Among respective areas of the COPY mode, the IMAGE SEND mode and the DOCUMENT FILING mode, a user touches a desired area so as to be able to select the mode.

When the image forming apparatus 1 is turned on, the display portion 101 displays an unillustrated initial screen, and when the IMAGE SEND mode is selected by the operation key 110, an IMAGE SEND initial screen 110a is displayed below the operation key 110.

On the lower left of the IMAGE SEND MODE initial screen 110a, an Ecoview icon 120 is displayed as an operation key.

Figure 5:
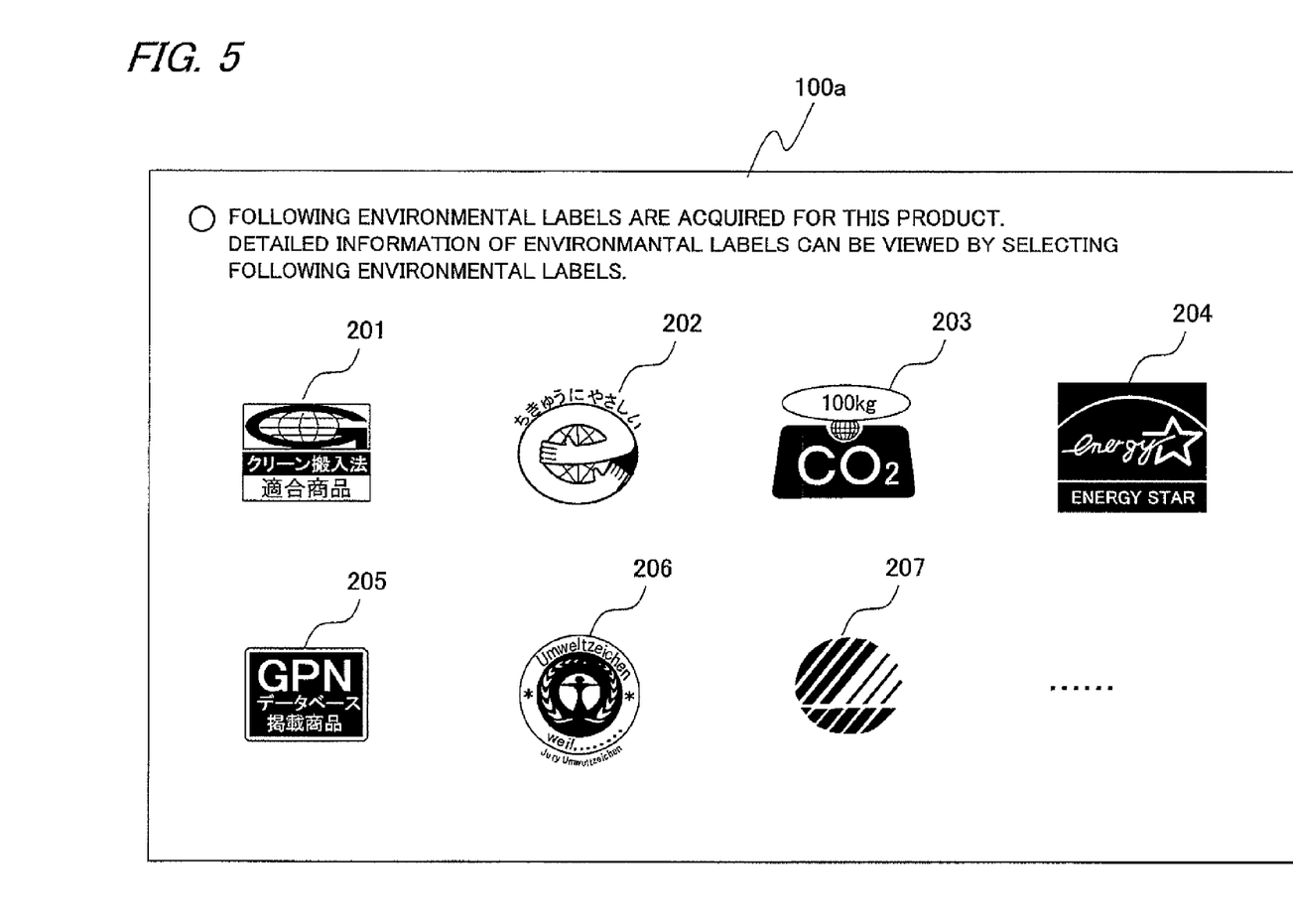
FIG. 5 is an explanatory view showing an example of thumbnail display displayed on the display portion of the operation panel.
Figure 6:
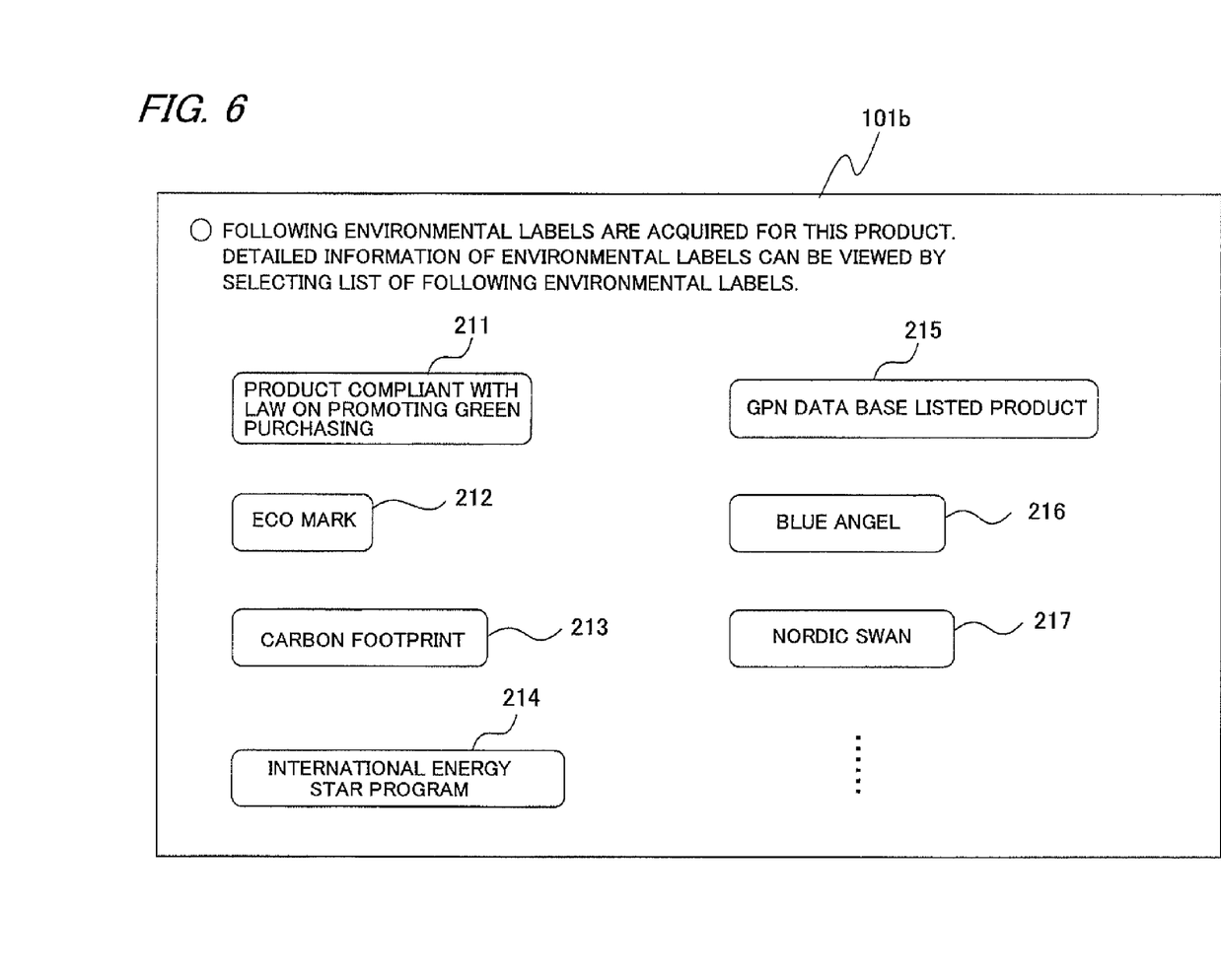
FIG. 6 is an explanatory view showing an example of list display displayed on the display portion of the operation panel.

When the Ecoview icon 120 is touched, environmental labels (environment-compliant acquisition information, eco label information) that are acquired or certified to the image forming apparatus 1 are displayed on the display portion 101 as thumbnail display (FIG. 5) or list display (FIG. 6). With such a configuration, it is possible to improve visibility of detailed information for a user.

Further, the operation panel 100 includes an icon (not shown) for switching between the list display (FIG. 6) and the thumbnail display (FIG. 5) and an icon (not shown) for returning to the IMAGE SEND MODE initial screen 110a.

Here, description will be given in detail for the thumbnail display or the list display as the environmental labels (environmental compliance acquisition information) displayed on the display portion 101 of the operation panel 100 with reference to the drawings.

Figure 7:
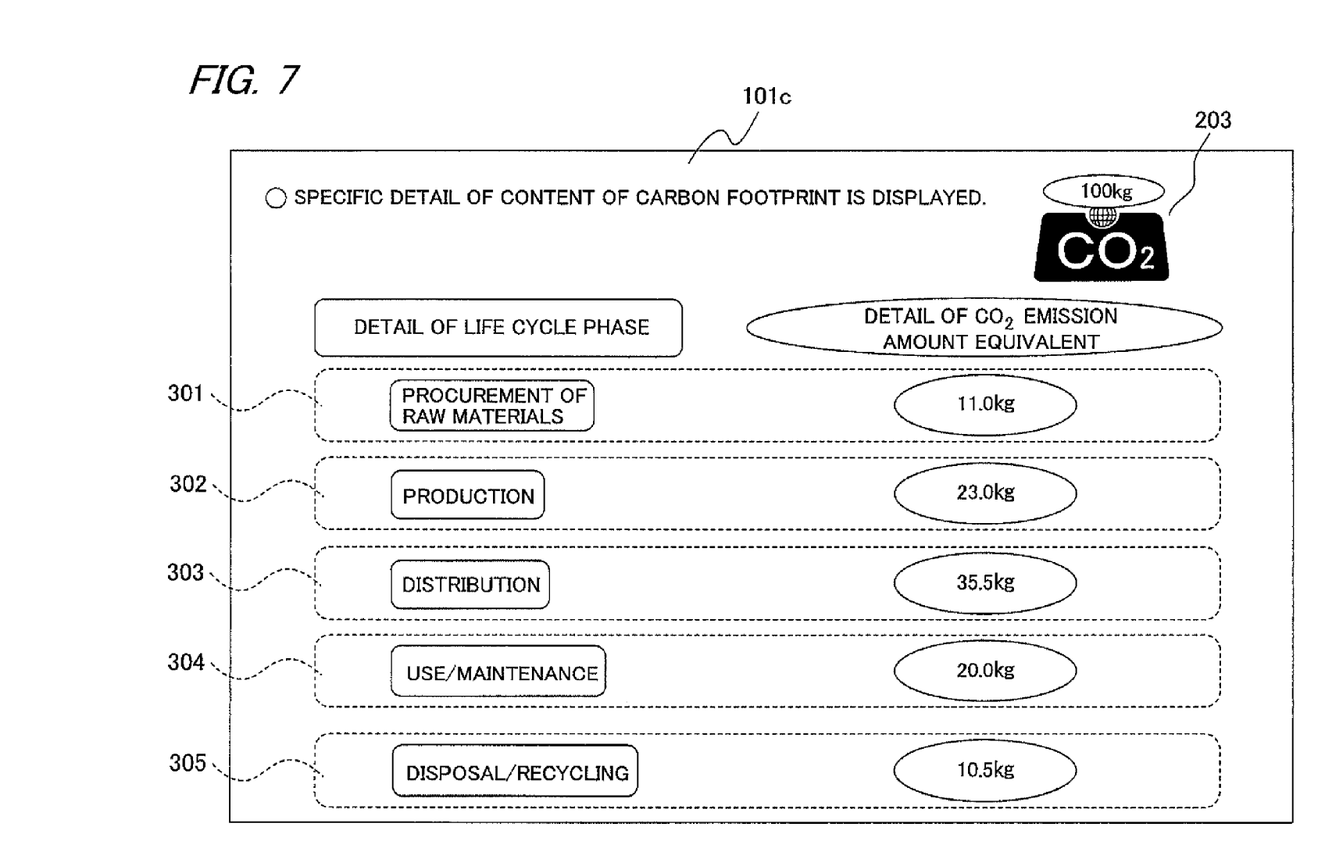
FIG. 7 is an explanatory view showing an example of detailed information concerning carbon footprint among environmental labels.

FIG. 5 is an explanatory view showing an example of the thumbnail display displayed on the display portion 101 of the operation panel 100, FIG. 6 is an explanatory view showing an example of the list display displayed on the display portion 101 of the operation panel 100, and FIG. 7 is an explanatory view showing an example of display of detailed information of carbon footprint as an environmental label.

In the present embodiment, on the display portion 101, a thumbnail display screen 101a for displaying logo marks of environmental labels in thumbnailed form (see FIG. 5) or a list display screen 101b for displaying names of the environmental labels in a list (see FIG. 6) is displayed.

On the thumbnail display screen 101a, displayed are, for example, as shown in FIG. 5, a thumbnail of a product compliant with Law on Promoting Green Purchasing 201, a thumbnail of Eco Mark (registered trademark) 202, a thumbnail of a carbon footprint label 203, a thumbnail of International Energy Star Program (registered trademark) 204, a thumbnail of a GPN data base listed product 205, a thumbnail of Blue Angel 206, a thumbnail of Nordic Swan (registered trademark) 207, and the like. Note that, for each of the thumbnails, a logo mark of each environmental label is used.

Note that, a $CO_2$ emission amount equivalent of the thumbnail 203 of the carbon footprint label in the drawing is set at 100 kg for the sake of explaining the present embodiment. This is because that the value changes for each of types of the image forming apparatus.

Furthermore, on the list display screen 101b, displayed are, for example, as shown in FIG. 6, an icon of a product compliant with Law on Promoting Green Purchasing 211, an icon of Eco Mark (registered trademark) 212, an icon of carbon footprint 213, an icon of International Energy Star Program (registered trademark) 214, an icon of a GPN data base listed product 215, an icon of Blue Angel 216, an icon of Nordic Swan (registered trademark) 217, and the like.

The product compliant with the Law on Promoting Green Purchasing is an environmental label based on the law stipulating Green Purchasing promoted by the Ministry of the Environment in the country and the municipalities.

The Eco Mark (registered trademark) is an environmental label based on Japanese standards in conformity with the ISO standards for certifying and indicating products contributing to environmental conservation in consideration of various environmental influences throughout a life cycle thereof.

The carbon footprint label is an environmental label for converting an emission amount of green house effect gases into a $CO_2$ emission amount in an entire life cycle and indicating thereof by utilizing an LCA (Life Cycle Assessment) method for quantitatively calculating environmental loads through an entire life cycle from procurement of raw materials to disposal/recycling for commodities and services.

The International Energy Star Program (registered trademark) is an environmental label that is focused on power consumption in the standby time of the office devices such as a personal computer and implemented in the U.S. and Japan.

The GPN data base listed product is an environmental label indicating products that are registered in data base based on the purchase guideline of the Green Purchase Network (GPN).

Blue Angel is an environmental mark in Germany and is one of the important indices for consumers to know environment-friendly products and attitudes of corporations for the environment, which is given to products which assessments carried out of environmental efforts at any steps from producing to disposal of a product as well as energy conservation or the like compared with other products with the same application and functions are excellent, and additionally, usability and safeness are ensured. Moreover, Nordic Swan (registered trademark) is an environmental label based on an officially-authorized eco label system in Nordic countries.

Each of the thumbnails displayed on the thumbnail display screen 101a (FIG. 5) or each of the icons displayed on the list display screen 101b (FIG. 6) also serves as a selective display portion (selective display key) for selectively displaying detailed information of a corresponding environmental label. With such a configuration, the detailed information that is desired by a user is able to be displayed readily so as to improve convenience of the operations.

For example, when a user touches the thumbnail of carbon foot print 203 displayed on the thumbnail display screen 101a of FIG. 5, or the icon of carbon footprint 213 displayed on the list display screen 101b of FIG. 6, the display portion 101 displays an environmental label detail display screen 101c of FIG. 7 in place of the display of FIG. 5 or FIG. 6, or alternatively, in addition to the display of FIG. 5 or FIG. 6.

The environmental label detail display screen 101c displays as the detailed information of the carbon footprint, details of each phase of the life cycle of the image forming apparatus 1, details of the $CO_2$ emission amount equivalent corresponding to each phase, and the logo mark of carbon footprint 203.

More specifically, as shown in FIG. 7, the environmental label detail display screen 101c concerning the carbon footprint of the image forming apparatus 1 is comprised of, as the "details of the life cycle phase", a plurality of items including procurement of raw materials 301, production 302, distribution 303, use and/or maintenance 304 (there is a case of abbreviating as use/maintenance 304), and disposal and/or recycling 305 (there is a case of abbreviating as disposal/recycling 305), on which "details of the $CO_2$ emission amount equivalent" is displayed corresponding to each of the items.

According to the embodiment, an environmental label is able to be displayed on the display portion 101 of the operation panel 100 in the image forming apparatus 1. Furthermore, a user selects (performs touch input of) a desired environmental label of the image forming apparatus 1, and the detailed information concerning the selected environmental label is thereby able to be displayed and confirmed readily.

That is, for example, a user with high environmental awareness is able to know the $CO_2$ emission amount equivalent concerning use/maintenance related to the image forming apparatus 1 used by the user himself/herself readily from the specific detailed information of the carbon footprint displayed on the display portion 101 as shown in FIG. 7.

Note that, "100 kg" displayed in the logo mark of carbon footprint label 203 shown in the upper right of FIG. 7 shows a total amount of the $CO_2$ emission amount equivalent in the life cycle (from procurement of raw materials to disposal/recycling) of the image forming apparatus 1.

In the case of the present embodiment, it is understood that the value "20.0 kg" of the $CO_2$ emission amount concerning the use/maintenance 304 occupies 20% of 100 kg of the total amount in the life cycle of the image forming apparatus 1, and by conserving a use amount or reducing a maintenance cost of the image forming apparatus 1, an activity to further reduce 20% is able to be assisted, thereby making it possible to gain a sense of satisfaction of capability of contributing to prevention of global warming.

Furthermore, since it is also understood that the $CO_2$ emission amount equivalent concerning the use/maintenance 304 is 20 kg, a dealer of the image forming apparatus 1 further attempts to propose renewal to and leasing of an image forming apparatus with a less $CO_2$ emission amount equivalent concerning the use/maintenance 304, and as the result, such attempt leads to sales promotion of the image forming apparatuses of the dealer.

Here, the carbon footprint information in the life cycle of the image forming apparatus 1 is a type and an emission amount of green house effect gases emitted during each phase of a procurement phase of raw materials, a production phase, a distribution phase, a use/maintenance phase, and a disposal/recycling phase of the image forming apparatus 1.

There are 6 types of the green house effect gases including $CO_2$, $CH_4$, $N_2O$, HFCs, PFCs, and $SF_6$ which are the targets of the Kyoto Protocol, and a value converted into $CO_2$ is recorded in the logo mark 203 so that the $CO_2$ equivalent of the image forming apparatus 1 is also displayed in the thumbnail display 203 of Ecoview (FIG. 5).

The $CO_2$ emission amount is calculated by a general formula (I) described below by utilizing the LCA (Life Cycle Assessment) method.

$$CO_2 \text{ emission amount} = \Sigma(\text{active mass } i \times CO_2 \text{ emission basic unit}) \quad (I)$$

Where, i is an integer variable relating to i=1 to 5 showing above-described each phase from the procurement of raw materials to the disposal/recycling, and the active mass i is an active mass (process) of each phase.

A specific example of the active mass (process) of each phase in the life cycle is shown below.

The active mass in the procurement phase of raw materials (i=1) is a material use amount.

The active mass in the production phase is an assembly weight and power consumption in production.

The active mass in the distribution phase (i=3) is a transport amount (a product of transportation distance, loading ratio and load capacity of a track).

The active mass in the use/maintenance phase (i=4) is a power consumption amount in usage.

The active mass in the disposal/recycling phase (i=5) is a landfill weight and a recycling weight.

Note that, the unit of the $CO_2$ emission amount is (kg).

Accordingly, in the logo mark 203 of FIG. 5 and FIG. 7, the character of $CO_2$ and a $CO_2$ emission amount (kg) are described as information.

Moreover, the unit of the $CO_2$ emission amount may be a unit indicating the weight such as (g) or (t) in addition to (kg).

Note that, in addition to the information of the above-described environmental labels in the life cycle of the image forming apparatus 1, information of various environmental labels is able to be displayed. Any mark such as a legal mark or an independent mark is possible. Moreover, even in the case of new environmental standards being stipulated in accordance with the trend of the times, display is possible to be performed similarly.

Furthermore, when the country or the region is different, environmental labels and authorized environmental labels to be acquired are different, however the present invention is able to be adapted to any cases.

In the present embodiment, entire control of the image forming apparatus 1 is performed by the control portion 501 as shown in FIG. 2.

The environmental label information (thumbnail information of FIG. 5, and icon information and detailed information of environmental label of FIG. 6), which is the environmental compliance acquisition information of the image forming apparatus 1, is recorded in the storage portion 502. The storage portion 502 may be an HDD device, a Blu-ray disc device, a ROM, a RAM, or a memory such as a USB memory or a memory card.

The environmental label information is read from the storage portion 502 to be displayed on the display portion 101 by the control of the control portion 501. In the case of obtaining the environmental label information recorded in the storage portion 502, a communication cost is able to be reduced.

Note that, the environmental label information is not limited to be recorded in the storage portion 502 and read from the storage portion 502 at the time of displaying on the display portion 101, and may be obtained via a wired or wireless communication line (network). In the case of obtaining the environmental label information via the network, storage capacity of the storage portion 502 is able to be reduced so that an inexpensive storage device is able to be used. Description will hereinafter be described for operations at the time of obtaining the environmental label information of the image forming apparatus 1 from a network.

Figure 8:
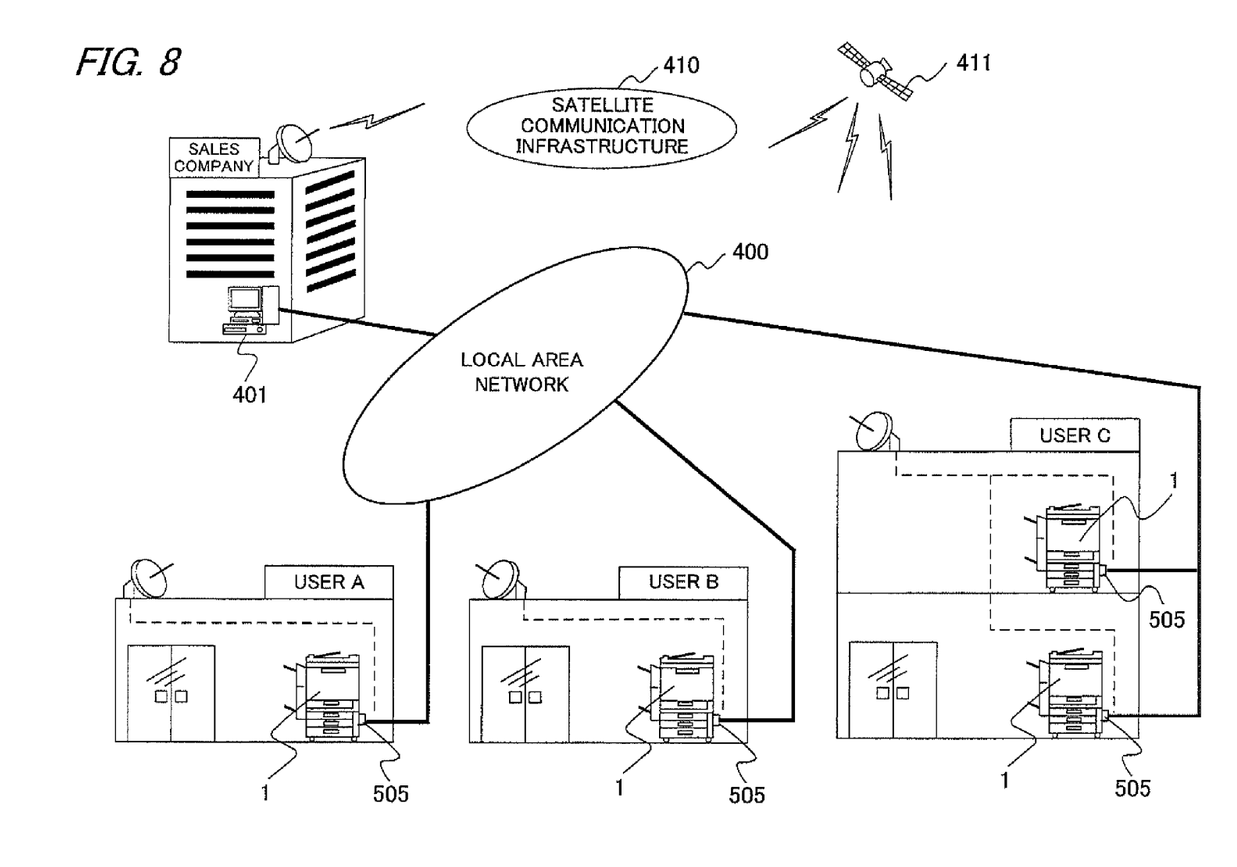
FIG. 8 is an explanatory view showing an example of a communication network for obtaining environmental label information of the image forming apparatus.
Figure 9:
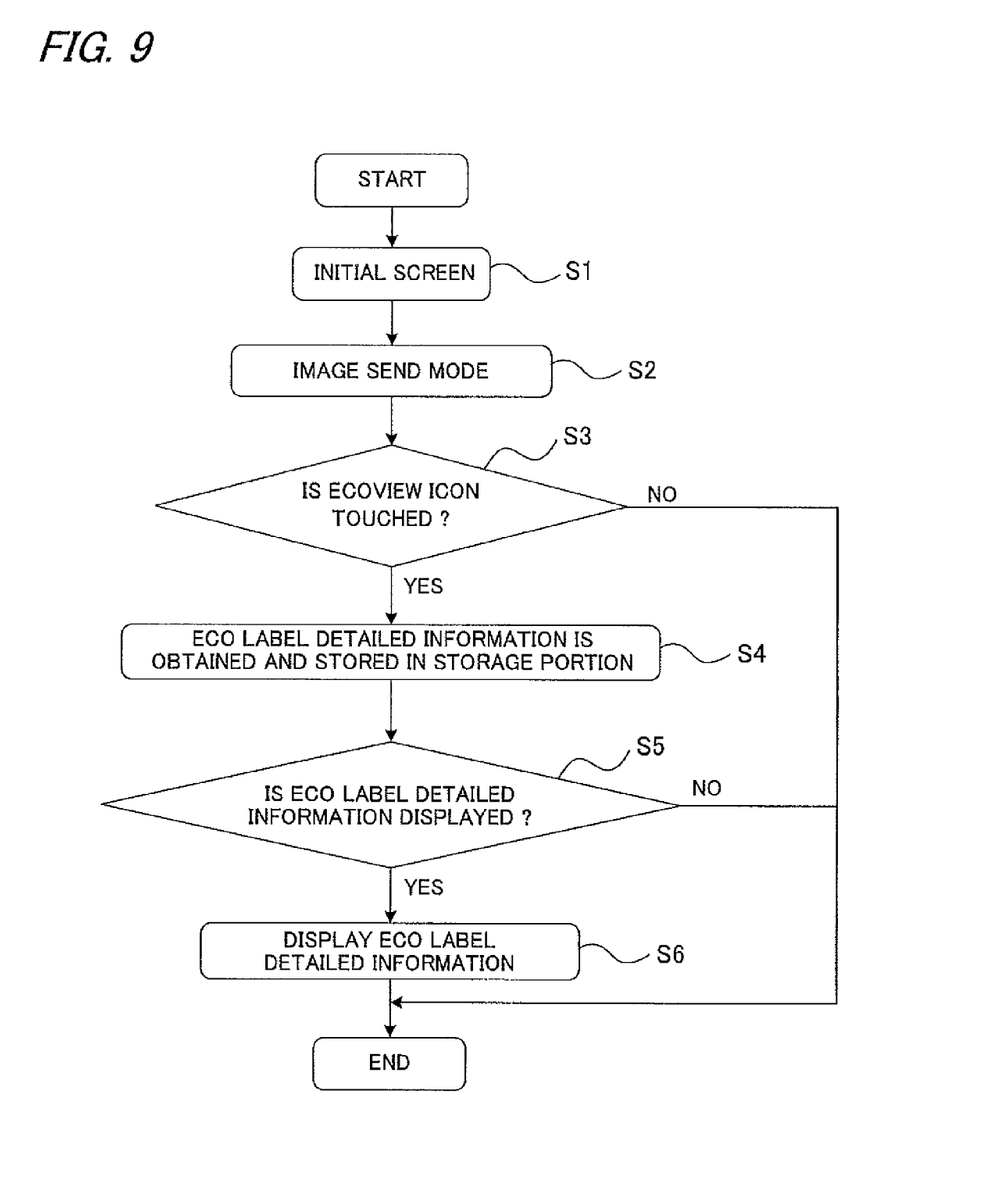
FIG. 9 is a flowchart showing a procedure at the time of obtaining the environmental label information of the image forming apparatus and displaying thereof on the display portion.

FIG. 8 is an explanatory view showing an example of a communication network for obtaining environmental label information of the image forming apparatus of the present embodiment, and FIG. 9 is a flowchart showing a procedure at the time of obtaining the environmental label information of the image forming apparatus and displaying thereof on the display portion.

Furthermore, the environmental label information is able to be obtained by accessing the website of a dealer or a leasing company having the environmental label information of the image forming apparatus 1 by a LAN connection in the communication portion 505 via a network.

For example, as shown in FIG. 8, a plurality of users A, B and C are able to access by the LAN connection in the communication portion 505 of the image forming apparatus 1 which is a terminal device for each thereof to a server 401 of a dealer or a leasing company, etc., via a LAN (Local Area Network) 400, or to access via satellite communication infrastructure 410 using a communication satellite 411.

As the LAN (Local Area Network) 400, in the case of the wired communication, 10BASE-T, 100BASE-TX, 10GBASE-T and the like of the Ethernet (registered trademark) IEEE standard, those of optical multimode such as 10BASE-F, 100BASE-F, 1000BASE-X, 10GBASE-R, 10GBASE-W, and 10GBASE-X are usable, and in the case of wireless communication, IEEE 802.16 of WiMAX (broadband wireless standards), IEEE 802.16a (standards of fixed wireless communication in which an available band of frequencies of IEEE 802.16 standard is changed), IEEE 802.16-2004 (a method used for a fixed area, alias: IEEE 802.16a/REVd), a WAN, and also cloud computing service (dedicated provider: cloud provider) are usable.

Next, description will be given for a case of obtaining the environmental label information of the image forming apparatus 1 from a network and displaying the information on the display portion 101 in the image forming apparatus 1 along with a flowchart.

As shown in FIG. 9, when the image forming apparatus is turned on, an unillustrated initial screen is displayed (step S1).

On the initial screen, the IMAGE SEND mode is selected with the operation key 110 for selecting processing mode of the image forming apparatus 1 so that the IMAGE SEND mode is executed (step S2). At this time, on the display portion 101, the IMAGE SEND MODE initial screen 110a is displayed.

The Ecoview icon 120 displayed on the IMAGE SEND mode initial screen 110a is then judged whether or not to be touched (step S3).

At step S3, when the Ecoview icon 120 is judged not to be touched, the obtaining processing of the environmental label of the image forming apparatus 1 is not executed and finished.

On the other hand, when the Ecoview icon 120 is judged to be touched at step S3, environmental label information is obtained by accessing to a website with the environmental label information of the image forming apparatus 1 via a network by the LAN connection in the communication portion 505, and then, the obtained environmental label information is stored in the storage portion 502 (step S4).

Then, the environmental label information is judged whether or not to be displayed on the display portion 101 (step S5). When the environmental label information is judged not to be displayed at step S5, the display processing of the environmental label information of the image forming apparatus 1 is not executed and finished.

On the other hand, when the environmental label information is judged to be displayed at step S5, the environmental label information of the image forming apparatus 1 is displayed on the display portion 101. The obtaining processing and the display processing of the environmental label information of the image forming apparatus 1 are then finished.

As described above, according to the embodiment, functions of performing the thumbnail display and the list display of the environmental label information obtained as the environmental compliance acquisition information for the image forming apparatus 1 are included in the operation panel 100 of the image forming apparatus 1 as a configuration of the display portion 101 as shown in FIG. 5 and FIG. 6. Furthermore, as shown in FIG. 7, the information concerning the carbon footprint label as an environmental compliance acquisition information, namely, the environmental label information including information on the type of green house effect gases ($CO_2$) and the total emission amount of the greenhouse effect gases in the life cycle of the image forming apparatus 1 is displayed, while the detailed information of the environmental label in the life cycle of the image forming apparatus 1 is able to be displayed. Thereby, it is possible to provide clear environmental information concerning the image forming apparatus 1 for the user. Accordingly, for example, information on conservation of the use frequency or capability to reduce the cost of the maintenance for the image forming apparatus 1 or the like is provided so as to serve as an information source for selecting an environment-friendly image forming apparatus at the time of renewal of the image forming apparatus by a user, thus making it possible to meet the needs of the user especially a user with high environmental awareness. As the result, it is also possible to contribute to prevention of global warming.

Note that, in the case of displaying the environmental label information in the image forming apparatus 1, it is preferred to be displayed at times other than during operation of print setting, FAX setting, mail setting or the like. When the image forming apparatus 1 is used by a plurality of users, there is a possibility that displaying the environmental label information may disturb various operation settings. Therefore, it is further preferable to display the environmental label information after turning on or at the time of recovering from the sleep mode of the image forming apparatus 1.

Moreover, the environmental label information may be displayed with a message such as "Please wait", "Adjusting image quality" or the like after turning on. By doing so, in the case of wishing to perform printing urgently in the image forming apparatus 1 or the like, the environmental compliance acquisition information (environmental label information) may be displayed after a Ready state in which the message such as "Please wait", "Adjusting image quality" or the like is cleared or after urgent printing processing is finished, or the like, so that it is possible to effectively use the image forming apparatus 1.

Note that, in the embodiment, as shown in FIG. 7, although the greenhouse effect gases ($CO_2$) and the emission amount of the greenhouse effect gases concerning use/maintenance in the life cycle of the image forming apparatus 1 are displayed as the detailed information of the environmental label, the present invention is not limited thereto.

For example, as detailed information of Blue Angel, values such as power consumption, an ozone amount, an amount of dust and mote and noise (volume of sound) may be displayed, and as detailed information of Nordic Swan (registered trademark), values of maximum standby power of a product (for example, copier: 0 W to 175 W, 5 W to 20 W in OFF mode) may be displayed.

Furthermore, in the embodiment, the Ecoview icon 120 is provided on the display portion 101, which serves as a switch for switching display, however, when the screen size is small and the operation portion (menu key, numeric pad, print key or the like) is also small so that the Ecoview icon is not able to be provided thereon, an Ecoview operation key may be included in a portion other than the display portion 101. Moreover, in the embodiment, the Ecoview icon 120 is provided on the lower right portion of the display portion 101, which is not particularly limited and may be provided in any portion among an upper portion, a lower portion, a left side and a right side.

Note that, in the embodiment described above, as a device to which the display device according to the present invention is applied, the operation panel 100 of the image forming apparatus 1 shown in FIG. 1 is explained as an example, which is however not limited to the image forming apparatus and the copier as described above as long as being a device including an operation panel having a display portion. For example, the display device according to the present invention is applicable for home electrical appliances, household equipment (referred to as, among electronic equipment or devices related to video images, audio, communication, etc., products developed and designed aiming for use by general consumers or use at standard home, or on the premise thereof, and standards of the products), service equipment (products developed on the premise of the application except the standard home such as corporations (companies, schools and public offices) etc.,) and the like.

Furthermore, the display device according to the present invention is also applicable to a personal computer or mobile communication terminal that are able to operate the image forming apparatus 1 via the LAN 400 and the image forming apparatus 1 of the embodiment, or an electric device including a display such as a liquid crystal display, an organic EL display, a plasma display, a plasma tube array display, and an electric paper display using electrophoresis or the like, and a display using electron emitting elements (FED, SED).

Hereinbefore, the present invention is not limited to the above-described embodiment, and various changes are possible within the range shown in claims. That is, the embodiments obtained by combining the technical means that are changed as appropriate within the range without departing from the spirit of the present invention are also included in the technical scope of the present invention.

What is claimed is:

1. An image forming apparatus including a display unit that displays an operating screen, the image forming apparatus comprising:
    a reception unit configured to receive an acquisition request for a carbon footprint of said image forming apparatus, said carbon footprint of said image forming apparatus being a calculated value of an environmental load of said image forming apparatus;

a carbon footprint acquisition unit configured to acquire an emission amount of greenhouse effect gases calculated based on active mass with regards to a procurement of a raw materials phase, a production phase, a distribution phase, a use-and-maintenance phase, and a disposal and recycling phase of said image forming apparatus, and a carbon footprint calculated based on said emission amount of greenhouse effect gases, as detailed information of the carbon footprint, when said reception unit receives an acquisition request; and a carbon footprint display unit configured to display said detailed information on a total emission amount of greenhouse effect gases during said phases and said carbon footprint on said operating screen of said display unit.

2. The image forming apparatus according to claim 1, wherein:

said reception unit is displayed in a coordinated manner in said operating screen of said display unit, and is configured to receive an acquisition request for said carbon footprint initiated by a user.

3. The image forming apparatus according to claim 1, further comprising:

a communication unit configured to communicate with a server, wherein said carbon footprint acquisition unit acquires said emission amount of said greenhouse effect gases and said carbon footprint from said server via said communication unit.

4. An image forming apparatus comprising:

a reception unit configured to receive an acquisition request for environmental information regarding said image forming apparatus; and a display unit configured to display an emission amount of greenhouse effect gases in a procurement phase of raw materials for said image forming apparatus on a display portion thereof when said reception unit receives an acquisition request.

5. An image forming apparatus comprising:

a reception unit configured to receive an acquisition request for environmental information regarding said image forming apparatus; and a display unit configured to display a total emission amount of greenhouse effect gases by said image forming apparatus on a display portion thereof when said reception unit receives an acquisition request, wherein said total emission amount of greenhouse effect gases includes an emission amount of greenhouse effect gases during a procurement phase of the raw materials of said image forming apparatus.

6. An image forming apparatus comprising:

a display unit configured to display an operating screen on a display portion thereof;

a reception unit configured to receive an acquisition request for environmental information regarding said image forming apparatus, said environmental information including at least information regarding the International Energy Star Program acquired by said image forming apparatus;

wherein, when said reception unit receives an acquisition request, said display unit displays an acquired copy of a logo mark of said International Energy Star Program on said display portion of said operating screen.

7. The image forming apparatus according to claim 6, further comprising:

a communication unit configured to communicate with a server that includes environmental information including information regarding the International Energy Star Program; and an environmental information acquisition unit configured to acquire environmental information that includes a logo mark of the International Energy Star Program, wherein the environmental information acquisition unit acquires the environmental information from said server via said communication unit, and wherein the display unit displays said logo mark of the International Energy Star Program on said display portion of said operating screen.

8. An image forming apparatus comprising:

a display unit configured to display an operating screen on a display portion thereof;

a reception unit configured to receive an acquisition request for information regarding said image forming apparatus, said information including at least information regarding the International Energy Star Program acquired by said image forming apparatus, wherein, when said reception unit receives an acquisition request, said display unit displays said information including a logo mark of the International Energy Star Program on said display portion of said operating screen.

9. The image forming apparatus according to claim 8, further comprising:

a communication unit configured to communicate with a server that includes said information on said image forming apparatus, said information including information regarding the International Energy Star Program;

an image forming apparatus information acquisition unit configured to acquire said information regarding said image forming apparatus, including said logo mark of the International Energy Star Program, and wherein said image forming apparatus information acquisition unit acquires said information regarding said image forming apparatus from said server via said communication unit, and wherein said display unit displays said information regarding said image forming apparatus, including said logo mark of the International Energy Star Program, on said display portion of said operating screen.

* * * * *